United States Patent
Nefzger et al.

(10) Patent No.: US 10,253,134 B2
(45) Date of Patent: Apr. 9, 2019

(54) RIGID PUR/PIR FOAMS OF ISOPROPYLIDENEDIPHENOL-BASED POLYETHERS

(71) Applicant: Covestro Deutschland AG, Pittsburgh, PA (US)

(72) Inventors: Hartmut Nefzger, Pulheim (DE); Stephan Schleiermacher, Pulheim (DE); Klaus Lorenz, Dormagen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 15/572,589

(22) PCT Filed: May 9, 2016

(86) PCT No.: PCT/EP2016/060287
§ 371 (c)(1),
(2) Date: Nov. 8, 2017

(87) PCT Pub. No.: WO2016/180757
PCT Pub. Date: Nov. 17, 2016

(65) Prior Publication Data
US 2018/0171062 A1 Jun. 21, 2018

(30) Foreign Application Priority Data

May 11, 2015 (EP) ..................... 15167106
Feb. 5, 2016 (EP) ..................... 16154562

(51) Int. Cl.
*C08G 18/76* (2006.01)
*C08G 18/48* (2006.01)
*C08G 65/48* (2006.01)

(52) U.S. Cl.
CPC ..... *C08G 18/4833* (2013.01); *C08G 18/7671* (2013.01); *C08G 65/48* (2013.01)

(58) Field of Classification Search
USPC .......................................................... 521/94
See application file for complete search history.

(56) References Cited

U.S. PATENT DOCUMENTS

2014/0243560 A1   8/2014   Lorenz et al.

FOREIGN PATENT DOCUMENTS

KR   20020065658 A   8/2002

OTHER PUBLICATIONS

Ionescu, M.; "Chemistry and Technology of Polyols for Polyurethanes"; 15.3—Bisphenol A Based Polyols; pp. 403-405; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 4—"Oligo-Polyols for Elastic Polyurethanes"; pp. 55-165; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 8—"Polyester Polyols for Elastic Polyurethanes"; pp. 263-294; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 13—"Polyether Polyols for Rigid Polyurethane Foams"; pp. 321-370; (2005); Rapra Technology Limited; Shawbury, Shrewsbury, Shropshire, SY4 4NR, United Kingdom.
Ionescu, M.; "Chemistry and Technology of Polyols for Polyurethanes"; Chapter 16—"Polyester Polyols for Rigid Polyurethane Foams"; pp. 419-434; (2005); Rapra Technology Limited; Shawbury, Shrewsbury, Shropshire, SY4 4NR, United Kingdom.
Kulesza, Kamil et al; "Journal of Analytical and Applied Pyrolysis"; vol. 76; "Thermal decomposition of bisphenol A-based polyetherurethanes blown with pentane Part I—Thermal and pyrolytical studies"; No. 1-2; pp. 243-248; Jun. 1, 2006; Science Direct; Elsevier.

*Primary Examiner* — Terressa Boykin
(74) *Attorney, Agent, or Firm* — N. Denise Brown

(57) ABSTRACT

The invention concerns a new polyol composition from isopropylidenediphenol-based polyethers, which are used in an advantageous manner for the production of polyurethane-polyisocyanurate (PUR-/PIR) rigid foams, as well as their production and use in PUR/PIR rigid foams.

15 Claims, No Drawings

RIGID PUR/PIR FOAMS OF ISOPROPYLIDENEDIPHENOL-BASED POLYETHERS

CROSS-REFERENCE TO RELATED APPLICATIONS

This Application is a National Phase Application of PCT/EP2016/060287, filed May 9, 2016, which claims priority to European Application No. 15167106.2, filed May 11, 2015, and to European Application No. 16154562.9, filed Feb. 5, 2016, each of which is being incorporated herein by reference.

FIELD

The present invention concerns a new polyol composition from isopropylidenediphenol-based polyethers, which are used in an advantageous manner for the production of polyurethane-polyisocyanurate (PUR-/PIR) rigid foams, as well as their production and use in PUR/PIR rigid foams.

BACKGROUND

Typically, polyurethane-polyisocyanurate (PUR-/PIR) rigid foams are produced by reacting a polyol- with an isocyanate component in the presence of a propellant. Furthermore, additives such as foam stabilisers and flame retardants can be added. Compared with other rigid foams such as PUR rigid foams, PUR-PIR rigid foams have excellent thermal stability and improved flammability properties. The cause of these improved properties is ascribed to isocyanurate structural elements.

For economic reasons, it is worth trying to use inexpensive raw materials as far as possible. In terms of the isocyanate-reactive component of a PUR/PIR rigid foam formulation, this means, for example, the use of inherently inexpensive production residues in which it is a basic prerequisite that hydroxyl groups are present or can be produced. The attempt to achieve improved sustainability should also be mentioned as a further aspect of the use of such production residues. The adaptation of production residues to expensive PUR-/PIR rigid foams avoids them being disposed of, such as by incineration, thereby conserving the environment and contributing to the reduction in the use of inherently scarce raw materials, and ultimately of crude oil.

A production residue of this type occurs in the distillation residue when Bisphenol A is produced. Raw Bisphenol A (BPA) is processed by purifying the reaction product of acetone and phenol by distillation, wherein so-called BPA resin occurs as a distillation residue. Depending on the intensity of this distillation process, this type of BPA resin can still have considerable proportions of an 4,4'-isopropylidenediphenol, e.g. 10 to 60% w/w. The remaining proportions are distributed amongst other structural elements derived from phenol, acetone and Bisphenol A, such as the 2,4'- and 2,2' isomers of the bisphenol base body. An example of a composition is described in KR 2002 0065658 A. There can be a considerable number of deviations from this in individual cases. Regardless of this, within the scope of the present application, the term BPA resin comprises substantially all distillation residues of Bisphenol A production processes.

Moreover, the consistency of the BPA resin also depends on the distillation process. While the melting point of the Bisphenol A (approx. 155° C.) is normally not close to being reached, nevertheless the softening point of the BPA resin still remains so high that there is no question of its direct use as an isocyanate-reactive component for this reason alone. For example, BPA resins soften between 70 and 100° C.; however, they are able to flow only at higher temperatures. It might be mentioned, furthermore, that the phenolic hydroxyl groups, when present in the BPA resin, are not generally suitable for the synthesis of polyurethanes, and particularly not if good long-term application properties are needed, in particular at an elevated temperature. Urethane groups based on phenolic hydroxyl groups qualify as thermolabile.

It is a task, therefore, of the present invention to produce a method for producing polyurethane-polyisocyanurate rigid foams using cost-effective polyols based on hydroxyl-functional residues from the production of Bisphenol A.

Within the meaning of this application, polyurethane-polyisocyanurate (PUR/PIR) rigid foams are characterised in that isocyanate groups are used in excess compared with isocyanate-reactive groups, so that both urethane groups are formed, as well as isocyanurate structural elements due to isocyanate-trimerisation reactions, and possibly urea groups from the reaction with water.

Besides urethane groups, urea groups and isocyanurate structures, the PUR/PIR rigid foams may even contain other groups, such those appearing by the reaction of the isocyanate group with other groups as well as with hydroxyl groups or other isocyanate groups. The reaction of the isocyanate group with urea groups results, for example, in biuret structures, similarly containing allophanate structures by the reaction of isocyanate groups with urethane groups. These structures are then present in the polymer together with the urethane-, urea- and isocyanurate groups.

Furthermore, the invention concerns the PUR/PIR rigid foams obtained in this manner as well as the use of the polyol mixtures producible in accordance with the inventive method in the production of PUR/PIR rigid foam with suitable surface layers.

The composite elements obtained in this manner and producible using conventional machines form a further subject matter of the invention.

Other subject matters of the invention are derivatives of the BPA resin which flow at room temperature and which are produced by alkoxylation, as well as a method for their production.

The alkoxylation of Bisphenol A itself is known (Mihail Ionescu in Chemistry and Technology of Polyols for Polyurethanes, Rapra Technology Limited, Shawbury, Shrewsbury, Shropshire, SY4 4NR, United Kingdom, 2005, pp. 403 ff), wherein three methods are described:

1.) Alkoxylation of Bisphenol A (with ethylene oxide (EO) or propylene oxide (PO)) as a suspension in an inert solvent at 90 to 120° C. in the presence of a basic catalyst, in particular in the presence of tertiary amines.
2.) alkoxylation of Bisphenol A as a suspension in liquid PO in the presence of a tertiary amine as a catalyst, wherein, after approx. 2 hours while stirring at 90 to 100° C., EO is added in a second step.
3.) Alkoxylation of Bisphenol A as an approx. 50% suspension in a separately made reaction product in the presence of a tertiary amine as a catalyst.

It is generally disadvantageous in these three methods to use the comparatively expensive Bisphenol A, as well as the technically challenging reaction as a suspension which always carries the risk of undesired sediments. It is a particular disadvantage in Method 1 to use an inert solvent which, on the one hand, limits the space-time-yield, and on the other hand, has to be separated expensively. From a process reliability standpoint, alternative Method 2 is classified as critical because a consequence of the reaction, if, for instance, the reactor cooling fails, can result in the significant adiabatic heating of the reacting mixture, thereby even triggering the exothermic decomposition of the contents of the reactor. A particular disadvantage of Method 3 is the use of the reaction product as a suspension agent which also affects the space-time-yield negatively.

A task of the present invention is also to overcome these disadvantages.

In the state of the art cited above, Ionescu described the possibility of using pure alkoxylated Bisphenol A as a starter for the production of urethane-isocyanurate foams. However, our own studies show that the flammability behaviour of PUR-/PIR foams based on pure ethoxylated Bisphenol A is not satisfactory (see also examples A1.5 in Table 1 and B1.7 in Table 3).

KR 2002 0065658 A describes the use of a BPA resin as a starter for the KOH-catalysed reaction exclusively with propylene oxide, wherein polyol mixtures with hydroxyl values of 300 to 500 mg KOH/g and with viscosities at 25° C. of 1500 to 4000 cps (cps corresponds to mPas) are obtained. Furthermore, the conversion the polyol mixtures to polyurethane (PUR) rigid foam is mentioned. The use for PUR/PIR rigid foams is not described.

Polyether, which is based on propylene oxide, has predominantly secondary hydroxyl end groups. Polyol components for PUR/PIR foams, whether they are polyether- or polyester polyols, should preferably have primary OH end groups however. The propoxylated BPA resin described in KR 2002 0065658 is therefore not particularly well suited for the production of PUR/PIR foams.

SUMMARY

Also, the state of the art does not disclose the production of an alkoxylated Bisphenol A (BPA) resin using predominately ethylene oxide or its use in PUR-/PIR foams. Apart from problems that may occur in using a resin of this type (e.g. due to solubility problems), the properties of the polyol mixture thus obtained, e.g. its viscosity and regarding the reaction to form a PUR-PIR foam (e.g. miscibility with the polyisocyanate component) are not known. The flammability behaviour, observed when using an ethoxylate based exclusively on Bisphenol A as a polyol for the production of PUR/PIR foam, does not make obvious the use of a BPA resin alkoxylated using predominately ethylene oxide. Also other properties, such as the coefficient of thermal conductivity, adhesion to surface layers, shrink characteristics, and the flame retardant qualities of such PUR-/PIR foams are not known.

Surprisingly it was now found that a BPA resin initially ethoxylated and the inventive ethoxylated BPA resin can be processed using a standard process to provide PUR/PIR foams of good quality. In the context of the present invention, "ethoxylated" is understood to mean the alkylene oxide mixture used for the alkoxylation of the BPA resin consists of at least 50% w/w of ethylene oxide, preferably at least 70% w/w of ethylene oxide, particularly preferred at least 90% w/w of ethylene oxide, particularly preferred at least 95% w/w and quite particularly preferred 100% w/w of ethylene oxide. In a similar fashion, the term "ethoxylation" comprises the alkoxylation of the BPA resin with epoxide compositions with the specified ethylene oxide contents. The ethylene oxide can be metered into the mixture with the other alkylene oxides, if they are to be used also, or in a block at the start, middle or end. Preferably, BPA resin alkoxylates are produced and used with ethylene oxide end blocks since these are characterised by enhanced concentrations of primary end groups which confer on the systems the necessary isocyanate reactivity for PUR/PIR foam applications.

The BPA resin used according to the invention involves a composition which occurs as a distillation residue during the production of Bisphenol A. The BPA resin contains at least 10% w/w, preferably 10-60% w/w of 4,4'-isopropylidenediphenol, and at least 5% w/w, preferably 10-40% w/w of 2,4'- and 2,2'-isomers of the bisphenol base body, and at least 10% w/w, preferably 10-40% w/w of compounds with chromane and/or indane base bodies.

The Bisphenol A (BPA) resin ethoxylated according to the invention (also called "BPA resin ethoxylate" below) involves a composition comprising a) at least 10% w/w, preferably at least 20% w/w, in particular preferably at least 30% w/w of an ethoxylate of 4,4'-isopropylidenediphenol, b) at least 5% w/w, preferably at least 10% w/w, of an ethoxylate of 2,4'- and 2,2'-isopropylidenediphenol, and c) at least 10% w/w, preferably at least 20% w/w, otherwise preferably at least 30% w/w, in particular preferably 40% w/w of an ethoxylate of further components which contain structural elements derived from phenol, acetone and/or isopropylidene diphenol (only the isomers of the isopropylidenediphenol).

The data in % w/w refer in each case to the total weight of the composition.

DETAILED DESCRIPTION

The ethoxylation of the BPA resin may be carried out by using known methods for alkoxylation in a homogenous phase, e.g. by placing the Bisphenol A (BPA) resin in a stirred autoclave together with a suitable catalyst and by slowly metering ethylene oxide in at an elevated temperature. Catalysts that may be used include tertiary amines with aliphatic, cycloaliphatic, aromatic and/or araliphatic residues bound to the nitrogen atom, and/or aromatic amines wherein the nitrogen atom may also be a part of a ring system and/or wherein the nitrogen atom may be part of an aromatic system. Systems with several nitrogen atoms are naturally included. Also, hydroxides or oxides can be used as well as the alkali and earth alkaline metals as catalysts. Preferably, the tertiary and/or aromatic amines mentioned are used. Used as catalysts, amines may have other functional groups, such as, e.g., hydroxyl groups, including phenolic hydroxyl groups or also isocyanate-reactive amine groups. The following tertiary amines are cited by way of example: triethylenediamine, n n-dimethylcyclohexylamine, 1-methyl-4-dimethylaminoethyl-piperazine, triethylamine, tributylamine, n n-dimethylbenzylamine, dicyclohexylmethylamine, n n' n"-tris-(dimethylamino-propyl)hexahydrotriazine, tris-(dimethylaminopropyl)amine, tris(dimethylaminomethyl)phenol, dimethylaminopropylformamide, n n n' n'-tetramethylethylenediamine, n n n' n'-tetramethylbutanediamine, n n n' n'-tetramethylhexanediamine, pentamethyldiethylenetriamine, pentamethyldipropylenetriamine, tetramethyldiaminoethylether, n n'-dimethylpiperazine, 1-azabicyclo[3.3.0]octane, bis-(dimethylaminopropyl)-urea, n-methylmorpholine, n-ethylmorpholine, n-cyclohexylmorpholine, 2,3-dimethyl-3,4,5,6-tetrahydropyrimidine, triethanolamine, triisopropanolamine, n-methyldiethanolamine, n-ethyldiethanolamine, n n-dimethylamineoethanol and tris-(n n-di-methylaminopropyl)-s-hexahydrotriazine. Examples of suitable aromatic amines are 1,2-dimethylimidazole, n-methylimidazole, imidazole and/or n n-dimethylamineopyridine. Suitable hydroxides of the alkali and earth alkaline metals are lithium- sodium-. potassium-, rubidium-, caesium-, magnesium-, calcium-, strontium- and barium hydroxides.

Preferably tertiary amines are those having no more than 3 aminic N atoms. Imidazol and its derivates, in particular n-methylimidazole, are the preferred aromatic amines.

Sodium hydroxide and potassium hydroxide are preferable among the alkali and earth alkaline hydroxides.

It is preferable when using tertiary and/or aromatic amines to have catalyst concentrations of 300 to 5000 ppm, in relation to all added substances. Alkali and earth alkaline hydroxides are used in concentrations of 50 to 5000 ppm, preferably of 100 to 3000 ppm, in particular preferably of 100 to 1500 ppm.

Also mixtures of several aminic catalysts, mixtures of several alkali and earth alkaline hydroxides, as well as mixtures of aminic catalysts and alkali and/or earth alkaline hydroxides can be used.

If necessary, suitable alkylene oxides such as propylene oxide, 1 2-butylene oxide or 2 3-butylene oxide and/or styrene oxide can be used alongside ethylene oxide. Preferably, propylene oxide can be used, if necessary in addition. The proportion of ethylene oxide should be at least 50% w/w, preferably at least 70% w/w, in particular preferably at least 90% w/w, in particular preferably at least 95% w/w and quite particularly preferably 100% w/w related to the total amount of dosed alkylene oxides.

According to the invention, furthermore, ethoxylated BPA resins are those whose catalysts are not neutralised once the synthesis has ended. Naturally, ethoxylated additives and auxiliary substances, such as antioxidants, can be added to the BPA resin.

The molar ratio of BPA resins to ethylene oxide-containing alkylene oxide mixture is chosen such that, per phenolic hydroxyl group, at least 1.5 mols of alkylene oxide, preferably at least 1.5 mols of ethylene oxide are used.

The inventive ethoxylated BPA resin have hydroxyl values of 100 to 400 mg KOH/g, preferably 120 to 300, in particular preferably 130 to 250 and viscosities measured at 25° C. of 600 to 10000 mPas, preferably 800 to 8000, in particular preferably 1000 to 6000.

Since the concentration of phenolic hydroxyl groups in the BPA resin may be difficult to record in individual cases, it may be advantageous to first perform a trial ethoxylation test with a sufficiently high amount of ethylene oxide and, using the discovered hydroxyl value of the product and the amount of BPA resin used, to derive the concentration of phenolic hydroxyl groups in the BPA resin.

Furthermore, it has proved advantageous to use the BPA resin at an elevated temperature, e.g. 50 to 100° C., if necessary already with the employed catalyst, and to replace the atmospheric oxygen with nitrogen by repeated evacuation followed by ventilation, wherein catalysts with low boiling points such as triethylamine should not be added until the atmospheric oxygen is replaced.

The reaction of the phenolic hydroxyl groups of the BPA resin with the ethylene oxide-containing alkylene oxide mixture takes place at an elevated temperature, preferably at 70 to 140° C., in particular preferably at 90 to 130° C. A solvent can be used in this process. Preferably, however, the reaction is carried out without a solvent. The temperature of the exothermic alkylene oxide addition reaction must be maintained at the desired level by cooling if necessary The addition of the ethylene oxide-containing alkylene oxide mixture to the mixture consisting of BPA resin and catalysts is conducted preferably continuously over a long period, for example 4 to 20 hours. However, the ethylene oxide-containing alkylene oxide mixture can also be added discontinuously in several portions. The dosing of the at least one alkylene oxide is done so that the safety-related pressure limits of the reactor system are not exceeded. Naturally, these are governed by the circumstances pertaining in individual cases, wherein the process is conducted generally at an absolute pressure in the range of 1 mbar to 10 bar, in particular preferably of 1 mbar to 4 bar. Particularly during the dosing of pure ethylene oxide, on grounds of process safety, care must be taken advantageously to maintain a sufficient partial inert gas pressure in the reactor during the run-up and dosing phase. As a rule, this should not be lower than 50% of the total pressure. The required partial inert gas pressure can be provided by, for example, inert gases or nitrogen.

Once the addition of the ethylene oxide-containing alkylene oxide mixture has concluded, normally a secondary reaction follows to complete the reaction. This generally happens in 5-30 hours, but it can also take over 30 hours. Once the secondary reaction time has expired, a vacuum step can take place to remove residues of any epoxides from the reaction mixture which may not have reacted. This vacuum step can be carried out at, for example, an absolute pressure of 500 mbar to 10 mbar over a period of 0.1 to 5 hours. The removal of traces of unreacted epoxides or other odour-forming, volatile, organic compounds can also be aided, moreover, by stripping after the (secondary) reaction phase and, if necessary, after the vacuum step. During stripping, volatile components are removed, such as (residual) alkylene oxides or secondary components from the BPA resin that could not be alkoxylated, by introducing inert gases and/or steam into the liquid phase while simultaneously applying a vacuum, for example by passing inert gas and/or steam through at an absolute pressure of 5 mbar to 500 mbar. Alternatively, the introduction of steam can also be produced by the direct introduction of water under the surface of the liquid, preferably at temperatures >100° C. and an absolute pressure of 5 mbar to 500 mbar. The quantity of water introduced, or, respectively, the quantity of steam introduced can be determined empirically, preferably between 10 and 30% w/w of water or steam, relative to the quantity of polyol to be purified. The removal of volatile components, either in the vacuum and/or by stripping, takes place at temperatures of 20° C. to 200° C., preferably at 50° C. to 160° C. and preferably while stirring. The stripping process can also be performed in so-called stripping columns in which an inert gas- or steam flow is passed in counterflow by the product flow. With regard to these stripping columns, they preferably involve columns with fittings or packed columns. In these types of columns, the transportation of the volatile auxiliary components is accelerated in the gas phase by enlarging the contact surface between liquid and gas space. Preferably the stripping is carried out with steam or water, if necessary accompanied by the introduction of inert gas(es). US 2014/0243560 A1, for example, provides a detailed description of suitable reaction performance conditions and apparatus for carrying out alkoxylation-(ethoxylation) reactions.

BPA resin ethoxylates thus obtained are used according to the invention for the production of PUR/PIR rigid foams.

In one embodiment, the basic catalysts used for the alkoxylation of the BPA resin are neutralised.

Organic and/or inorganic proton acids (bronsted acids) are regarded as suitable reagents for neutralising the basic catalyst used in the alkoxylation of the BPA resin. Preferably non-oxidising organic and/or inorganic proton acids, are, for example, sulphuric acid, phosphoric acid, dibutyl phosphate, hydrochloric acid, lactic acid, adipic acid, glutaric acid, succinic acid, or similar. They can be added to the reaction mixture both in a pure form as well as in the form of an aqueous solution, once the alkoxylation reaction has finished. Preferably, aqueous solutions are used.

Also suitable in the same manner are polyester polyols with fractions of end-located carboxyl groups, which can be obtained by polycondensation from low molecular polyols and low molecular polycarboxylic acids.

The neutralisation is carried out by, for example, adding the acid, while stirring and at temperatures of the reaction mixture of 25 to 95° C.; however, it can take place at lower or higher temperatures. The amount of neutralising agent is calculated so that at least 0.5 mols of acidic protons are added per mol of basic catalyst. The mol ratios of basic catalyst to acidic protons are preferably 1:0.5 to 1:5, in particular preferably 1:0.75 to 1:2 and quite particularly preferably 1:0.8 to 1:1.5.

Aminic catalysts can be neutralised by alkylation also. Examples of agents that are suitable for alkylation are organic sulphonic acid phenyl esters, e.g. p-toluenesulphonic acid alkyl ester, sulphuric acid dialkyl ester, such as dimethyl sulphate, methyl iodide, oxalic acid dialkyl ester and alkyl esters of other organic acids. The alkyl residues may be of any structure, examples of which are methyl, ethyl, propyl, isopropyl, n-butyl and isobutyl. With regard to mol ratios, the process is analogous to the neutralisation versions using proton acids.

It has been shown, surprisingly, that, during the course of neutralising the basic catalysts, an advantageous processing behaviour of the alkoxylated BPA resin can be adjusted in the foaming to produce PUR/PIR foam as well as advantageous foam properties, e.g. regarding brittleness. In particular, during the course of neutralising, it is possible adjust starting and curing times of the PUR/PIR reaction.

PUR/PIR rigid foams, within the meaning of the present invention, are, in particular, those PUR/PIR foams whose bulk density, according to DIN EN ISO 3386-1-98 in the version of September 2010, fall in the range of 15 kg/m$^3$ to 300 kg/m$^3$ and their compressive strength according to DIN EN 826 in the version of May 1996 fall in the range of 0.1 MPa to 5 MPa.

A further subject matter of the present invention is therefore a method of producing a PUR/PIR foam comprising the steps
a) react at least one BPA resin ethoxylate according to the invention with
b) at least one polyisocyanate-containing component,
c) at least one propellant,
d) at least one catalyst,
e) if necessary, at least one flame retardant and/or further auxiliary substances and additives
f) if necessary, at least one further compound with at least two groups reactive with respect to isocyanates.

The aliphatic, cycloaliphatic and in particular aromatic di- and/or polyisocyanates that can be used for the production of PUR/PIR rigid foams are worth considering as the polyisocyanate-containing component. Preferably, toluylene diisocyanate (tdi), diphenylmethane diisocyanate (mdi) and, in particular, mixtures of diphenylmethane diisocyanate and polyphenylene polymethylene polyisocyanates (polymeric mdi) are used. The isocyanates can also be modified, such as by assembling uretdione-, carbamate-, isocyanurate-, carbodiimide-, allophanate- and in particular urethane groups.

Polymeric mdi is used, in particular, for the production of PUR/PIR rigid foams. Based on the current state of knowledge, the formation of isocyanurate structures is carried out almost exclusively during the foaming reaction and results in flame-resistant PUR/PIR foams which are used preferably in the engineering field, such as in construction as insulating panels, sandwich elements and truck superstructures.

Compounds which are described below in general terms can be used as, where applicable, suitable further compounds (f) with at least two groups reactive with respect to isocyanates, i.e. with at least two hydrogen atoms reactive with isocyanate groups.

Those compounds in particular having two or more reactive groups, selected from OH groups, SH groups, NH groups, NH$_2$ groups and CH acidic groups, such as β-diketo groups, in the molecule can be considered as compounds with at least two groups reactive with respect to isocyanate. Compounds with 2 to 8 OH groups are used, in particular, to produce the polyurethane rigid foam obtained preferably from the method according to the invention. Polyether polyols and/or polyester polyols are used for preference.

Polyether polyols and/or polyester polyols are used for preference. The expert is familiar with the use of polyether polyols and polyester polyols for the synthesis of polyurethane. These have been described, for example, by Ionescu in "Chemistry and Technology of Polyols for Polyurethanes", Rapra Technology Limited, Shawbury 2005, pp. 55 ff. (Chap. 4: Oligo-Polyols for Elastic Polyurethanes), pp. 263 ff. (Chap. 8: Polyester Polyols for Elastic Polyurethanes) and in particular on pp. 321 ff. (Chap. 13: Polyether Polyols for Rigid Polyurethane Foams) and pp. 419 ff. (Chap. 16: Polyester Polyols for Rigid Polyurethane Foams).

The hydroxyl value of the polyether polyols and polyester polyols used is preferably 25 to 850 mg KOH/g, in particular preferably 25 to 450 mg KOH/g and has a functionality of 2 to 8. Also preferable is a hydroxyl value greater than 160, in particular preferably greater than 200 mg KOH/g. In one embodiment, mixtures of the above polyether polyols are used also.

Furthermore, the component (f) can contain chain-extending and/or cross-linking agents. In particular di- or trifunctional amines and alcohols, in particular diols and/or triols with molecular weights lower than 400 g/mol, preferably from 60 to 300 can be used as chain-extending and/or cross-linking agents.

Propellants (c) are used also; within the scope of the present invention, the term propellant comprises both physical as well as chemical propellants. In this case, chemical propellants are understood to be those compounds which form gaseous products by reacting with isocyanate. On the other hand, physical propellants are meant as those compounds which are used in a liquid or gaseous form and do not react chemically with the isocyanate.

Physical propellants are understood as those compounds which are dissolved or emulsified in the input substances used in the polyurethane production and vaporise under the normal reaction conditions. These include, for example, hydrocarbons such as cyclopentane, isopentane and n-pentane, butane and propane, halogenated hydrocarbons, and other compounds, such as perfluorised alkanes, like perfluorhexane, perfluorised alkenes, such as 1,1,1,2,3,4,5,5,5-nonafluoro-4-(trifluoromethyl)-2-pentene, 1,1,1,3,4,4,5,5,5-nonafluoro-2-(trifluoromethyl)-2-pentene or cis-1,1,1,4,4,4-hexafluoro-2-butene, chlorofluoro alkenes, such as trans-1-chloro-3,3,3-trifluoropropene, and ethers, esters, ketones and/or acetals. Preferably hydrocarbons and/or water are used as the propellant component (c). Particularly preferred hydrocarbons are n-pentane, cyclopentane, iso-pentane and/or mixtures of the isomers. Cyclopentane and/or n-pentane are used in particular as the propellant (c).

Chemical propellants are, for example, water and/or carboxylic acid, which, in a reaction with isocyanates, releases carbon dioxide while forming urea or amides.

The propellant component (c) is used preferably in quantities of 0.1 to 30% w/w, preferably 0.5 to 20% w/w, in particular preferably 0.7 to 15% w/w, in relation to the total weight of the components (a) to (f). In a preferable embodiment, the propellant mixture (c) contains hydrocarbons, in particular n-pentane and/or cyclopentane and water.

At least one polyisocyanate (b) is in a preferable embodiment, and is selected from the group consisting of toluylene diisocyanate (tdi), diphenylmethane diisocyanate (mdi) and polyphenylene polymethylene polyisocyanates (polymeric mdi) and mixtures thereof, and at least one propellant c) selected from the group consisting of water, cyclopentane, n-pentane, iso-pentane, fluorohydrocarbons and partly-halogenated alkenes with 3 or 4 carbon atoms, and from mixtures thereof.

The known polyurethane or polyisocyanurate-forming catalysts can be used, for example, as catalysts (d) for the production of the inventive PUR/PIR rigid foams, the catalysts including organic tin compounds, such as tin diacetate, tin dioctoate, dibutyltin dilaurate and/or strongly basic amines such as 2,2,2-diazabicyclooctane, triethylamine, triethylenediamine, pentamethyldiethylenetriamine, n n dimethylcyclohexylamine or bis(n n dimethylaminoethyl)ether, n n dimethylbenzylamine and n-methylimidazole, and, to catalyse the PIR reaction, examples include potassium acetate, sodium acetate, sodium-n-[(2-hydroxy-5-nonylphenyl)methyl]-n-methylaminoacetate, 2,4,6-tris[(3-dimethylamino)propyl]hexahydrotriazine, potassium octoate and aliphatic quaternary ammonium salts, e.g. tetramethylammonium pivalate.

The catalysts are used preferably in quantities of 0.05 to 3% w/w, preferably 0.06 to 2% w/w, in relation to the total weight of all components (a) to (f).

The reaction of the aforementioned components takes place in the presence, if necessary, of (e) additives, such as flame retardant agents, fillers, cell regulators, foam stabilisers, surface-active compounds and/or stabilisers against oxidation-related, thermal or microbiological degradation or ageing, as the case may be, preferably in the presence of flame retardants and/or foam stabilisers. Substances are designated as foam stabilisers when they promote the formation of a regular cell structure during foam formation. Examples include: silicon-containing foam stabilisers, such as siloxan-oxyalkylene polymer mixtures and other organopolysiloxanes, other alkoxylation products of fatty alcohols, oxo alcohols, fatty amines, alkylphenols, dialkylphenols, alkyl cresols, alkylresorcinol, naphthol, alkylnaphthol, naphtylamine, aniline, alkylaniline, toluidine, Bisphenol A, alkylated Bisphenol A, polyvinyl alcohol, as well as other alkoxylation products of condensation products from formaldehyde and alkylphenols, formaldehyde and dialkylphenols, formaldehyde and alkyl cresols, formaldehyde and alkylresorcinol, formaldehyde and aniline, formaldehyde and toluidine, formaldehyde and naphthol, formaldehyde and alkylnaphthol and formaldehyde and Bisphenol A. Ethylene oxide and/or propylene oxide can be used, for example, as alkoxylation reagents.

The flame retardants known from the state of the art can be used as a general rule. Suitable flame retardants include brominated ethers (e.g. Ixol® B251), brominated alcohols such as dibrominopentylalcohol, tribrominopentylalcohol and PHT-4-Diol as well as chlorinated phosphates such as tris-(2-chlorethyl)phosphate, tris-(2-chlorisopropyl)phosphate (TCPP), tris(1,3-dichlorisopropyl)phosphate, tris-(2,3-dibrompropyl)phosphate and tetrakis-(2-chlorethyl)-ethylenediphosphate. Other than the halogen-substituted phosphates already mentioned, inorganic flame retardants, such as red phosphorus, preparations containing red phosphorus, aluminium oxide hydrate, antimony trioxide, ammonium polyphosphate and calcium sulphate or cyanuric acid derivates, such as melamine or mixtures of at least two flame retardants, such as ammonium polyphosphates and melamine as well as, if necessary, starch to flameproof the inventively produced PUR- or PUR-/PIR rigid foams can also be used. To provide further liquid, halogen-free retardants, diethyl-ethylphosphonate (deep), triethylphosphate (tep), dimethyl propyl phosphonate (dmpp), diphenyl cresyl phosphate (dpk) and others can be used. Within the scope of the present invention, the retardants are used preferably in an amount of 0 to 30% w/w, in particular preferably from 0.3 to 25% w/w, in particular from 0.5 to 5% w/w, in relation to the total weight the components (a) to (f).

More detailed data about the starter substances quoted above and about others can be found in the technical literature, such as the "Kunststoffhandbuch" (Plastics Manual), Volume VII, Polyurethanes, Carl Hanser Verlag Munich, Vienna, 1st, 2nd and 3rd Editions 1966, 1983 and 1993.

In one embodiment, the following input proportions to use, in relation to all input substances a) to f) are:
  19 to 29% w/w of a BPA resin-ethoxylate a),
  56 to 74% w/w of a polyisocyanate-containing component b),
  0.7 to 15% w/w of a propellant c),
  0.06 to 3% w/w of catalysts d),
  0.5 to 5% w/w of a flame retardant and/or further auxiliary agents and additives e) and
  0 to 10% w/w of other compounds with at least two groups f) reactive with respect to isocyanates.

In a preferable embodiment, the following input proportions to use, in relation to all input substances a) to f) are:
  22 to 27% w/w of a BPA resin-ethoxylate a),
  60 to 68% w/w of a polyisocyanate-containing component b),
  3 to 7% w/w of a propellant c),
  0.5 to 2% w/w of catalysts d),
  3 to 5% w/w of a flame retardant and/or further auxiliary agents and additives e) and
  0 to 4% w/w of other compounds with at least two groups f) reactive with respect to isocyanates.

In order to produce the polyurethane rigid foams, the polyisocyanates (b) and the components (a) and if necessary (f) are used in such quantities that the isocyanate ratio of the formulation is >100, as a rule 110 to 600, preferably 150 to 500, in particular preferably 180 to 450.

The isocyanate ratio (also called the ratio or isocyanate index) in this case is understood as the quotient of the quantity [mol] of isocyanate groups actually used and the quantity [mol] of isocyanate reactive groups actually used, multiplied by 100:

Index=(mols of isocyanate groups/mols of isocyanate reactive groups)*100

The PUR/PIR rigid foams can be produced discontinuously or continuously using known processes. The expert knows, amongst other things, how blocks of foam are produced (continuously and discontinuously), their application in single component systems (discontinuous) and in formed insulation foam (discontinuous). The invention described here refers to all methods. A preferable method is the continuous double belt method for producing composite elements containing PUR/PIR-rigid foam cores and one or more surface layers, wherein flexible and/or rigid materials can be used as surface layers.

Materials comprising the surface layer can include, for example, concrete, wood, particle board, aluminium, copper, steel, stainless steel, paper, mineral wool and plastic, as well as multilayer composites. Preferred plastics are acrylonitrile butadiene styrene copolymers, polyethylene, polystyrene, polyvinyl chloride and polypropylene. In these cases, the type of surface layer is not limited in principle; it can consist of shaped parts, structural elements from structural engineering, pipes, housing parts, etc.

The polyurethane rigid foams according to the invention and comprising PUR- and preferably PUR-/PIR rigid foams preferably have a closed cell content greater than 90%, in particular preferably greater than 95%.

Preferably PUR-, or, as the case may be, PUR-/PIR foams according to the invention have a density from 25 $g/m^3$ to 300 $g/m^3$, in particular preferably from 28 $g/m^3$ to 50 $g/m^3$.

The polyurethane rigid foams according to the invention are used in particular for heat insulation, such as in cooling appliances, containers or buildings, e.g. in the form of insulated pipes, sandwich elements, insulation sheets or as an insulated layer in cooling appliances.

The invention will be explained in more detail with the aid of the following examples.

EXAMPLES

The following analysis methods were used in the examples:

Hydroxyl value: The determination of the OH value was done according to the provisions of DIN 53240-1 (Method without catalyst; version of June 2013).

Acid value: According to DIN EN ISO 2114 (version of June 2002)

Coefficient of thermal conductivity: According to DIN EN 12667 (version of May 2001) at a temperature difference of 20 K and a mean temperature of 10° C.

Setting time: The setting time ("gel point $t_G$") is determined by dipping a wooden stick into the reacting polymer melt and removing it. It characterises the point in time from which the polymer melt hardens. $t_G$ represents the point in time at which strands can be drawn for the first time between wooden stick and polymer melt.

Start time: The time span extending from the start of mixing the main components to the first visible signs of the foaming of the mixture.

Bulk density: The bulk densities were determined according to DIN EN ISO 3386-1 (version of September 2010).

Dimensional stability: is determined by measuring, at room temperature, the precise dimensions of a cuboid test body which had been sawn from a foam block such that its volume is at least 100 $cm^3$ and had no compaction at the edges, wherein at least 12 hours elapse between foam production and creation of the test body. The test body thus obtained is stored for the specified time (e.g. 24 hours) at an elevated temperature (e.g. 100° C.), and its dimensions are again determined after cooling down for 30 minutes at room temperature. The relative changes in the measurements are stated as a percentage of the respective original dimensions.

Viscosity: Dynamic viscosity: Rheometer MCR 51 made by the Anton Paar company according to DIN 53019-1 (version of September 2008) with a measuring cone CP 50-1, diameter 50 mm, angle 1° at shear rates of 25, 100, 200 and 500 $sec^{-1}$. The inventive and non-inventive polyols display viscosity values independent of the shear rate.

Flammability properties: Were determined according to DIN EN ISO 11925-2 (version of February 2011) and DIN 4102-1 (version of May 1998).

Raw Materials Used

Levagard PP: trischlorisopropylphosphate; flame retardant for PUR rigid foams and Duroplasts from the Lanxess company DMCHA: Jeffcat DMCHA; n n-dimethylcyclohexylamine from the Huntsman company Tegostab B 8421: Foam stabiliser (Evonik).

Desmorapid® 726B: Activator from Covestro Deutschland AG for the production of polyurethane (PUR) rigid foam.

Additiva 1132: Baymer additive from Covestro Deutschland AG.

Desmorapid DB: n n-dimethylbenzylamine, catalyst (Lanxess AG).

Desmorapid 1792: catalyst (Covestro Deutschland AG).

c-/i-pentane: Cyclopentane/isopentane 30/70% w/w, propellant from Azelis Deutschland GmbH Isocyanate: Mixture of MDI monomers and polymers, an NCO value of approx. 31.5% w/w and a viscosity of approx. 290 mPas at 20° C. (Desmodur® 44V20L, BMS AG)

STEPANPOL PS-2352: Modified aromatic polyester-polyol from the Stepan company
   with improved compatibility with propellants with a viscosity of 3000 mPas (25° C.), a hydroxyl value of 240 mg KOH/g, an acid count of 0.8 mg KOH/g, and a functionality of 2.0.

Bisphenol A: Bisphenol A from the Aldrich company

NMI: n-methylimidazole (BASF SE)

DMAE: n n-dimethyl aminoethanol (Aldrich)

EO: Ethylene oxide (Ineos)

PO: Propylene oxide (Lyondell)

Irganox® 1076: Octadecyl-3-(3,5-di-tert-butyl-4-hydroxyphenyl)propionate, antioxidant (BASF SE)

BPA resin: BPA resin from Bayer MaterialScience AG; containing approx. 44% % w/w 4,4'-isopropylidenediphenol, 20% w/w, 2,4'- and 2,2'-isopropylidenediphenol, and 36% w/w components containing the structural elements derived from phenol, acetone and/or isopropylidenediphenol, but are not isomers of the isopropylidenediphenol Lactic acid: 85%, aqueous, Sigma-Aldrich

A1.) Production of Non-neutralised, Alkoxylated BPA Resin

Production Instructions for the BPA Resin Ethoxylation in Polyol Example A1.2

811.1 g of BPA resin and 2.419 g of DMAE were placed in a 2 l laboratory autoclave at 80° C. Oxygen was removed after closing the filling nozzle by filling the apparatus three times, respectively, with nitrogen at 3.0 bar (absolute pressure) and then releasing as excess pressure was reduced to atmospheric pressure. While stirring at 200 rpm (cross arm stirrer), the contents of the autoclave were heated to 120° C. In doing so, the absolute pressure towards the end of the heating phase was 1.32 bar. The stirrer speed was increased to 800 rpm and 800.1 g of EO were dosed to the autoclave over a period of 8.12 hours. Towards the end of the dosing phase, the absolute pressure in the reactor reached a maximum value of 4.8 bar. After a secondary reaction time of 21 hours, an absolute pressure of a constant 2.9 bar was reached. Then, the product was heated for 0.5 hours in a vacuum at 120° C. After cooling to 80° C., 0.811 g of Irganox® 1076 were added. The OH value of the product was 223 mg KOH/g and the viscosity at 25° C. was 3760 mPas.

The polyols A1.1, A1.3, A1.4 and A1.5 were produced in accordance with the information in the production instructions provided by way of example for the polyol A1.2 and using the amounts of raw materials listed in Table 1. Furthermore, Table 1 lists analytic data and physical properties of the polyols.

TABLE 1A

Production and properties of the non-neutralised polyols

| Polyol | | A1.1 | A1.2 | A1.3 | A1.4 | A1.5 |
|---|---|---|---|---|---|---|
| BPA resin | [g] | 774.8 | 811.1 | 817.9 | 615.4 | — |
| Bisphenol A | [g] | | | | | 679.7 |
| Toluene | [ml] | | | | | 160[2)] |
| PO | [g] | 764.4 | — | — | — | — |
| EO | [g] | — | 800.1 | 807.0 | 592.1 | 820.1 |
| Catalyst | | NMI | DMAE | KOH[1)] | NMI | NMI |
| Catalyst concentration | [ppm] | 1500 | 1500 | 300 | 1500 | 1500 |
| Hydroxyl value | [mg KOH/g] | 212 | 223 | 211 | 210 | 225 |
| Viscosity | [mPas], 25° C. | 17650 | 3760 | 4695 | 5685 | 2600 |

[1)]KOH was added as a 45% w/w aqueous solution, and after reaction, secondary reaction and vacuum step was neutralised with lactic acid by adding lactic acid in a molar ratio of 1.2:1 to the employed KOH as a 85% w/w solution in water. The water involved in the neutralisation was removed by heating for 3 hours at 110° C.
[2)]Due to the high melting point of Bisphenol A (155° C.), toluene was used as an inert solvent. Once the reaction has ended, the toluene was distilled out finally in a high vacuum at 120° C.

TABLE 1B

Production and properties of the further non-neutralised polyols

| Polyol | | A1.6[3)] | A1.7[3)] | A1.8[3)] | A1.9[3)] | A1.10[3)] |
|---|---|---|---|---|---|---|
| BPA resin | [g] | 555.4 | 491.5 | 498.2 | 2496.6 | 2500.6 |
| EO | [g] | 674.2 | 718.2 | 728 | 3647.6 | 3653.5 |
| Catalyst | | DMCHA | DMCHA | DMCHA[4)] | DMCHA | DMCHA |
| Catalyst concentration | [ppm] | 2033 | 2990 | 3986[2)] | 4024 | 3989 |
| Hydroxyl value | [mg KOH/g] | 204 | 190 | 182 | 185 | 192 |
| Viscosity | [mPas], 25° C. | 2460 | 2055 | 1505 | 1587 | 1663 |

[3)]A1.6, A1.7 and A1.8 were produced in a 2 l autoclave, A1.9 and A1.10 were produced in a 10 l autoclave.
[4)]The dimethylcyclohexylamine was added to the reaction mixture in two portions of equal size: the first half was already present from the beginning; the second half was added after 500 g of ethylene oxide had been dosed.

A2.) Production of Neutralised, Alkoxylated BPA Resin

Production Instructions for the BPA Resin Ethoxylation and Neutralisation in Polyol Example A2.5:

2150.8 g of BPA resin and 7.19 g of NMI were placed in a 10 l laboratory autoclave at 80° C. Oxygen was removed after closing the filling nozzle by filling the apparatus three times, respectively, with nitrogen at an absolute pressure of 3.0 bar and then releasing as excess pressure was reduced to atmospheric pressure. While stirring at 200 rpm (cross arm stirrer), the contents of the autoclave were heated to 120° C. In doing so, the absolute pressure towards the end of the heating phase was 1.23 bar. The stirrer speed was increased to 450 rpm and 2613.5 g of EO were dosed in the gas space of the autoclave over a period of 5.52 hours. Towards the end of the dosing phase, the absolute pressure in the reactor reached a maximum value of 4.4 bar. After a secondary reaction time of 1.2 hours, the product was heated for 0.9 hours in a vacuum at 120° C. After cooling to 80° C., 73.142 g of an aqueous 11.74% w/w sulphuric acid solution were added and it was stirred for 30 minutes at 80° C. Next, 2.374 g of Irganox® 1076 were added and, after stirring for another 30 minutes at 80° C., the product was discharged into a glass flask. After an air-nitrogen exchange, 952 g of distilled water were introduced at 120° C. over a period of 10.25 hours by means of a dropping funnel through a Teflon tube under the surface of the liquid while stirring and the contents of the flask were stripped at the same time under an applied vacuum. Once the addition of water had ended, heating was resumed for 2 hours at 120° C. in the vacuum. The OH value of the product was 190 mg KOH/g and the viscosity at 25° C. was 3100 mPas.

The polyols A2.1, A2.2, A2.3 and A2.4 were produced in accordance with the information in the production instructions provided by way of example for the polyol A2.5 and using the amounts of raw materials listed in Table 2. Furthermore, Table 2 lists analytic data and physical properties of the polyols.

TABLE 2

Production and properties of the neutralised polyols

| Polyol | | A2.1 | A2.2 | A2.3 | A2.4 | A2.5 |
|---|---|---|---|---|---|---|
| BPA resin | [g] | 3032.3 | — | 756.8 | 817.9 | 2150.8 |
| EO | [g] | 2991.5 | — | 746.4 | 807.0 | 2613.5 |
| Catalyst | | NMI | — | DMAE | KOH[1)] | NMI |
| Catalyst concentration | [ppm] | 1500 | — | 1500 | 300 | 1500 |
| Polyol A2.1 | [g] | — | 2172.4 | — | — | — |
| Hydroxyl value | [mg KOH/g] | 210 | 210 | 211 | 211 | 190 |
| Irganox 1076 | [g] | | 3.042 | — | 0.756 | 0.863 | 2.734 |

TABLE 2-continued

Production and properties of the neutralised polyols

| Polyol | | A2.1 | A2.2 | A2.3 | A2.4 | A2.5 |
|---|---|---|---|---|---|---|
| Viscosity | [mPas], 25° C. | 5685 | n.b. | 4760 | 4695 | 3100 |
| Neutralising agent | | none | sulphuric acid[2] | sulphuric acid[2] | lactic acid | sulphuric acid[2] |
| Quantity of neutralising agent | [g] | 0 | 33.2469 (11.83%) | 6.067 (11.83%) | 1,137 | 73.142 (11.74%) |

[1]KOH was added as a 45% w/w aqueous solution, and after reaction, secondary reaction and vacuum step was neutralised with lactic acid by adding lactic acid in a molar ratio of 1.2:1 to the employed KOH as a 85% w/w solution in water. The water involved in the neutralisation was removed by heating for 3 hours at 110° C.
[2]Sulphuric acid: an aqueous sulphuric acid solution was used with the specified concentration (% w/w).

B1.) Production of PUR/PIR Foams Using Non-Neutralised Polyols (A1.x)

PUR/PIR rigid foams were produced in the laboratory with the polyols from examples A1.1, A1.2, A1.3, A1.4, A1.5, and with Stepanol PS 2353. In addition, flame retardants, foam stabilisers, catalysts, water and propellants were added to the particular polyol.

The isocyanate-reactive composition thus obtained was mixed with the isocyanate and poured into a mould. The mixture itself was produced using a stirrer at 4200 rpm and with the raw substances at 23° C. The exact compositions including the results of corresponding physical studies are summarised in Table 3.

Example B1.3 involves a Formulation Based on a polyesterpolyol which represents a market standard. B1.3 serves as a guide towards the properties that the examples according to the invention have to more or less attain.

The non-inventive example B1.2 in line with the Korean application KR 2002 0065658 A cannot, on the one hand, be processed on standard equipment as a result of the high viscosity of the polyol A1.1, based on propoxylated BPA resin (refer also to Table 1), and, on the other hand, turns out to be inert with comparable B1.3 catalysts (see Table 3, start and setting times).

TABLE 3

Production and properties of PUR/PIR foams B1.x from the polyols A1.x

| | | B1.1 | B1.2 | B1.3 | B1.4 | B1.5 | B1.6 | B1.7 |
|---|---|---|---|---|---|---|---|---|
| Formulation: | | | | | | | | |
| Polyol A1.1 | [g] | 78 | 78 | | | | | |
| STEPANPOL PS-2352 | [g] | | | 78 | | | | |
| Polyol A1.2 | [g] | | | | 78 | | | |
| Polyol A1.3 | [g] | | | | | 78 | | |
| Polyol A1.4 | [g] | | | | | | 78 | |
| Polyol A1.5 | [g] | | | | | | | 78 |
| Levagard PP | [g] | 15 | 15 | 15 | 15 | 15 | 15 | 15 |
| Tegostab B8421 | [g] | 2 | 2 | 2 | 2 | 2 | 2 | 2 |
| Water | [g] | 1.2 | 1.2 | 1.2 | 1.2 | 1.2 | 1.2 | 1.2 |
| Desmorapid 1792 | [g] | 5 | 2.4 | 2.6 | 2.3 | 2.6 | 2.4 | 2.1 |
| DMCHA | [g] | 1.2 | 0.2 | 0.9 | 0.3 | 0.3 | 0.2 | 0.3 |
| c-/i-pentane | [g] | 15 | 15 | 15 | 15 | 15 | 15 | 15 |
| Isocyanate | [g] | 210 | 210 | 210 | 210 | 210 | 210 | 210 |
| Isocyanate index | | 327 | 325 | 309 | 327 | 336 | 339 | 327 |
| Properties: | | | | | | | | |
| Start time | [sec] | 8 | 25 | 9 | 7 | 8 | 8 | 9 |
| Setting time | [sec] | 65 | 205 | 38 | 47 | 44 | 47 | 42 |
| Dimensional stability after 24 h at 100° C. and 30 min at RT in length, width and depth | | | | | ≤+/−0.5 | | | |
| Dimensional stability after 24 h at −22° C. and 30 min at RT in length, width and depth | | | | | ≤+/−0.2 | | | |
| KBT[1] flame position | | Side | | Side | Side | Side | Side | Side |
| Mean flame height | [mm] | 200 | n.d. | 125 | 134 | 129 | 130 | 148 |
| Classification in fire test acc. to DIN 4102-1 | | B3 | n.d. | B2 | B2 | B2 | B2 | B3 |
| Bulk density | [kg/m³] | 34 | 37 | 33.0 | 34.5 | — | 33.5 | 34.5 |
| Coeff. of thermal conductivity at mean temperature 10° C. | [mW/Km] | 22.2 | 24.7 | 20.2 | 20.4 | | 20.5 | n.d.[2] |

KBT[1]: Small burner test acc. to DIN 4102-1
[2]n.d.: not determined

B2.) Production of PUR/PIR Foams Using Neutralised Polyols (A2.x)

PUR/PIR rigid foams were produced in the laboratory with the polyols from examples A2.1, A2.2, A2.4, and with Stepanol PS 2353. In addition, flame retardants, foam stabilisers, catalysts, water and propellants were added to the particular polyol.

The isocyanate-reactive composition thus obtained was mixed with the isocyanate and poured into a mould. The mixture itself was produced using a stirrer at 4200 rpm and with the raw substances at 23° C. The exact compositions including the results of corresponding physical studies are summarised in Table 4.

TABLE 4

Production and properties of PUR/PIR foams B2.x from the polyols A2.x

|  |  | B2.1 | B2.2 | B2.3 |
|---|---|---|---|---|
| Formulation: | | | | |
| STEPANPOL PS-2352 | [g] | 78 | | |
| Polyol A2.1 | [g] | | | |
| Polyol A2.2 | [g] | | 78 | |
| Polyol A2.4 | [g] | | | 78 |
| Levagard PP | [g] | 15 | 15 | 15 |
| Tegostab B8421 | [g] | 2 | 2 | 2 |
| Water | [g] | 1.2 | 1.2 | 1.2 |
| Desmorapid 1792 | [g] | 2.6 | 2.4 | 2.6 |
| DMCHA | [g] | 0.9 | 0.6 | 0.3 |
| c-/i-pentane 30/70 | [g] | 15 | 15 | 15 |
| Isocyanate | [g] | 210 | 210 | 210 |
| Isocyanate index | | 309 | 324 | 336 |
| Properties: | | | | |
| Start time | [sec] | 9 | 7 | 8 |
| Setting time | [sec] | 38 | 41 | 44 |
| Foam core | | tough | tough | tough-brittle |
| Dim. stab. temperature: 100° C. | | | | |
| Dim. stab. 24 h L1 | [%] | 0 | 0 | 0.1 |
| Dim. stab. 24 h L2 | [%] | −0.2 | 0.2 | −0.1 |
| Dim. stab. 24 h D | [%] | −0.2 | −0.2 | −0.2 |
| Dim. stab. temperature: −22° C. | | | | |
| Dim. stab. 24 h L1 | [%] | 0 | −0.3 | 0 |
| Dim. stab. 24 h L2 | [%] | −0.1 | −0.3 | 0 |
| Dim. stab. 24 h D | [%] | 0.1 | 0.1 | 0.1 |
| KBT, flame position | | Side | Side | Side |
| Classification acc. to EN | | E | E | E |
| Bulk density | [kg/m$^3$] | 33.0 | 35 | 32.9 |
| Coeff. of thermal conductivity at mean temperature 10° C. | [mW/Km] | 20.2 | 20.4 | n.d.[2)] |

KBT[1)]: Small burner test acc. to EN 11925
[2)]n.d.: not determined

Example B2.1 involves a formulation based on the polyesterpolyol STEPANPOL PS-2352 which represents a market standard. B2.1 serves as a guide towards the properties that the examples according to the invention have to more or less attain.

B3.) Production of PUR/PIR Foams Using Non-Neutralised Polyols (A1.x), Wherein the Foams were Produced Using High-Pressure Mixing The production of the foams according to B3.) is done by means of a so-called laboratory flask dosing unit based on Reaction Injection Moulding (RIM) technology.

TABLE 5

Formulation and properties of PUR/PIR foams B3.x from the polyols A1.x, wherein the foams were produced using high-pressure mixing

|  |  | B3.1(V) | B3.2 | B3.3 |
|---|---|---|---|---|
| Formulation: | | | | |
| Stepanpol PS 2352 | [g] | 78 | | |
| Polyol A1.9 | [g] | | 78 | |
| Polyol A1.10 | [g] | | | 78 |
| Levagard PP | [g] | 15 | 15 | 15 |
| Tegostab B8421 | [g] | 2 | 2 | 2 |
| Water | [g] | 1.2 | 1.2 | 1.2 |
| Additive 1132 | [g] | | 0.8 | 0.8 |
| Desmorapid 1792 | [g] | 2.2 | 3.1 | 3.1 |
| Desmorapid 726B | [g] | 0.9 | 0.3 | 0.3 |
| c-/i-pentane 30/70 | [g] | 18 | 18 | 18 |
| Isocyanate | [g] | 210 | 210 | 210 |
| Isocyanate index | | 313 | 350 | 342 |
| Properties: | | | | |
| Start time | [sec] | 5 | 3 | 3 |
| Setting time | [sec] | 24 | 23 | 21 |
| Bulk density | [kg/m$^3$] | 28.7 | 30.7 | 30.4 |
| Foam core | | tough | tough | tough |
| Dim. stab. temperature: 100° C. | | | | |
| Dim. stab. 24 h L1 | [%] | 0.4 | 0.1 | 0.3 |
| Dim. stab. 24 h L2 | [%] | 0.3 | 0.1 | 0.1 |
| Dim. stab. 24 h D | [%] | −0.3 | −0.3 | −0.2 |
| Dim. stab. temperature: −22° C. | | | | |
| Dim. stab. 24 h L1 | [%] | −0.2 | −0.1 | −0.1 |
| Dim. stab. 24 h L2 | [%] | −0.1 | 0.0 | −0.1 |
| Dim. stab. 24 h D | [%] | 0.1 | 0.1 | 0.0 |
| Dim. stab. temperature: 70° C./95% relative | | | | |
| Dim. stab. 24 h L1 | [%] | 3.1 | 2.7 | 2.1 |
| Dim. stab. 24 h L2 | [%] | 3.4 | 2 | 2 |
| Dim. stab. 24 h D | [%] | −0.4 | 0 | 0.2 |
| Dim. stab. 7 d L1 | [%] | 2.5 | 2.8 | 2.5 |
| Dim. stab. 7 d L2 | [%] | 2.8 | 2.3 | 2.4 |
| Dim. stab. 7 d D | [%] | 0 | 0.1 | 0.3 |
| KBT acc. to EN 11925, flame | | Side | Side | Side |
| Mean flame height | [mm] | 150 | 145 | 149 |
| Classification acc. to EN 11925 | | E | E | E |
| Coeff. of thml. cond at mean temp. | | | | |
| 0 value | [mW/m] | 19.90 | 19.97 | 20.22 |
| 14 days storage at 70° C. | [mW/m] | 23.96 | 24.51 | 24.49 |
| 1 month storage at 70° C. | [mW/m] | 24.63 | 24.96 | 24.85 |

KBT: Small burner test acc. to EN 11925

Table 5 shows that the test B3.2 and B3.3, according to the invention, with regard to their properties succeed in the comparative test B3.1(V) in all important parameters.

The invention claimed is:

1. An ethoxylated Bisphenol A (BPA) resin, comprising
   a) at least 10% by weight, based on 100% by weight of said ethoxylated BPA resin, of an ethoxylate of 4,4'-isopropylidenediphenol,
   b) at least 5% by weight, based on 100% by weight of said ethoxylated BPA resin, of an ethoxylate of 2,4'- and 2,2'-isopropylidenediphenol, and
   c) at least 10% w/w by weight, based on 100% by weight of said ethoxylated BPA resin, of an ethoxylate of components containing the structural elements which are derived from phenol, acetone and/or isopropylidenediphenol, but which are not isomers of the isopropylidenediphenol.

2. The ethoxylated Bisphenol A (BPA) resin according to claim 1 with a hydroxyl value of 100 to 400 mg KOH/g, and a viscosity measured at 25° C. of 600 to 10000 mPas.

3. A method for producing an ethoxylated Bisphenol A (BPA) resin according to claim 1, comprising reacting a BPA resin comprising at least 10% by weight, based on 100% by weight of said BPA resin, of 4,4'-Isopropylidendiphenol, at least 5% by weight, based on 100% by weight of said BPA resin, of the 2,4'- and 2,2'-isomers of the bisphenol base body and at least 10% by weight, based on 100% by weight of said BPA resin, of compounds with chromane and/or indane base bodies with an ethylene oxide-containing alkylene oxide mixture comprising at least 50% by weight, based on 100% by weight of said ethylene oxide-containing alkylene oxide mixture, of ethylene oxide.

4. The method according to claim 3, wherein the reaction is carried out in the homogeneous phase.

5. The method according to claim 3, wherein at least 1.5 mols of an ethylene oxide-containing alkylene oxide mixture are used per mol of phenolic hydroxyl group in the BPA resin in the reaction.

6. The method according to claim 4, wherein the reaction occurs in the presence of a tertiary amine catalyst having with aliphatic, cycloaliphatic, aromatic and/or araliphatic residues bound to the nitrogen atom, and/or an aromatic amine catalyst.

7. The method according to claim 6, wherein the amine is neutralised after the reaction of the BPA resin with the ethylene oxide-containing alkylene oxide mixture.

8. The method according to claim 3, wherein no solvent is present during the reaction.

9. An ethoxylated Bisphenol A (BPA) resin, obtainable by the method according to claim 3.

10. A method for producing a PUR/PIR-rigid foam, comprising reacting
a) a polyol component
c) at least one propellant,
d) at least one catalyst,
e) if necessary, at least one flame retardant and/or further auxiliary substances and additives, and
f) if necessary, at least one further compound with at least two groups reactive with respect to isocyanates,
with a polyisocyanate b), wherein the polyol component a) comprises an ethoxylated Bisphenol A (BPA) resin according to claim 1.

11. A method according to claim 10, comprising reacting
a) 19 to 29% by weight, based on 100)% by weight of components a), b, c) d), e) and f), of a BPA resin ethoxylate according to claim 1,
c) 0.7 to 15% by weight, based on 100% by weight of components a), b), c), d), e) and f) of a at least one propellant,
d) 0.06 to 3% by weight, based on 100% by weight of components a), b), c), d), e) and f), of at least one catalyst,
e) 0.5 to 5% by weight, based on 100% by weight of components a), b), c), d), e) and f), of a flame retardant and/or further auxiliary substances and additives,
f) 0-10% by weight, based on 100% by weight of components a), b), c), d), e) and f) of further compounds with at least two groups reactive with respect to isocyanates, with
b) 56 to 74% by weight, based on 100% by weight of components a), b), c), d), e) and f), of a at least one polyisocyanate.

12. A method according to claim 10, wherein said polyisocyanate b) comprises at least one of toluylene diisocyanate (tdi), diphenylmethane diisocyanate (mdi), polyphenylene polymethylene polyisocyanates (polymeric mdi), or combinations thereof, and said propellant c) comprises at least one of water, cyclopentane, n-pentane, iso-pentane, fluorocarbons with 3 or 4 carbon atoms, partly-halogenated alkenes with 3 or 4 carbon atoms, or combinations thereof.

13. A method according to claim 10, wherein the foaming is carried out against at least one surface layer while forming a compound element comprising the PUR/PIR rigid foam and at least one surface layer.

14. A method according to claim 13, wherein at least one surface layer consists of a material comprising paper, cardboard, concrete, wood, particle board, aluminium, copper, steel, stainless steel, plastic, or combinations thereof.

15. The PUR/PIR rigid foam obtained according to the method of claim 10.

* * * * *